(No Model.) 2 Sheets—Sheet 1.
N. VAN DER SLEEN & A. SCHNELLER.
APPARATUS FOR STERILIZING AND PURIFYING WATER.
No. 596,917. Patented Jan. 4, 1898.
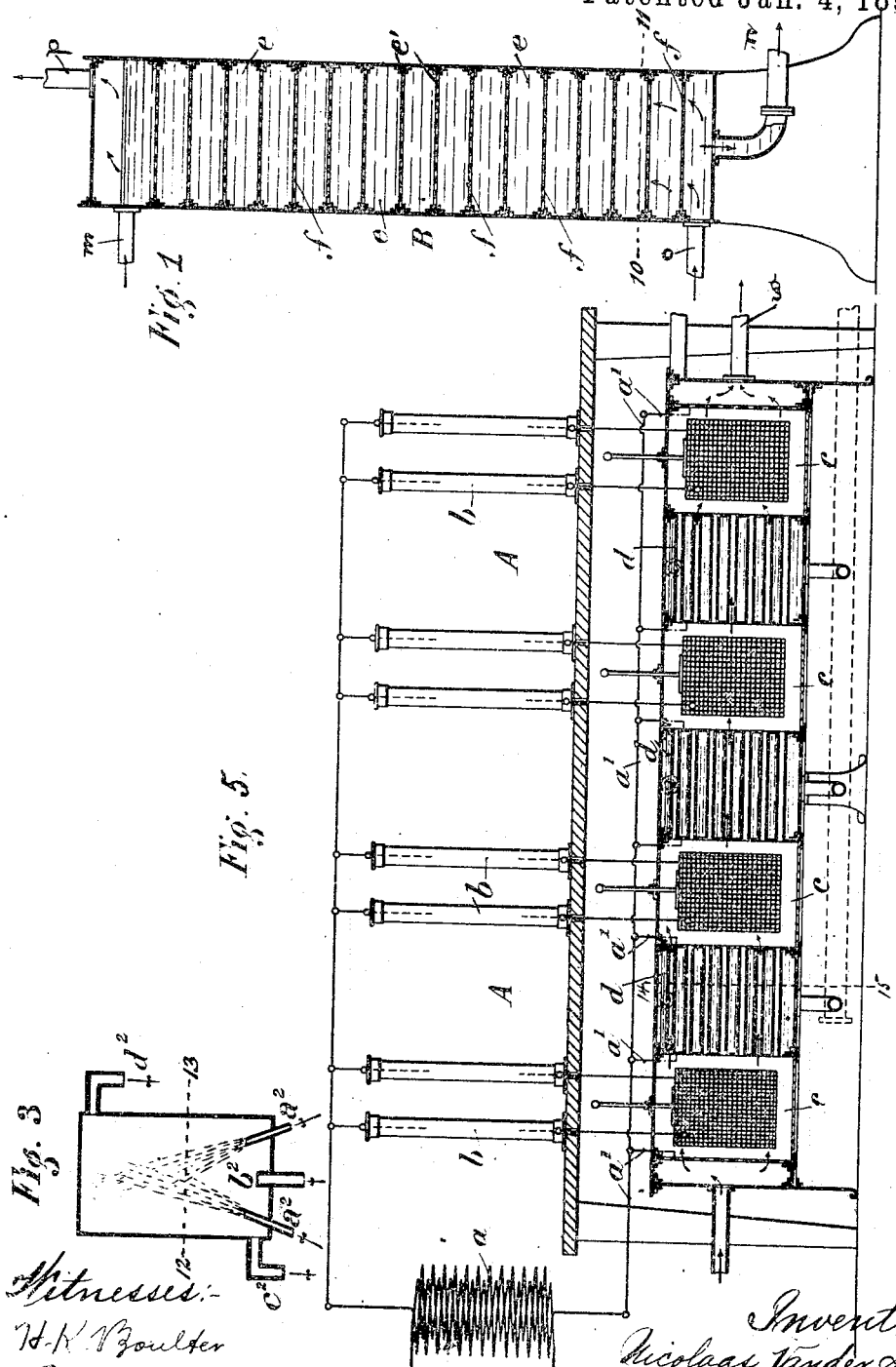

(No Model.) 2 Sheets—Sheet 2.
N. VAN DER SLEEN & A. SCHNELLER.
APPARATUS FOR STERILIZING AND PURIFYING WATER.
No. 596,917. Patented Jan. 4, 1898.
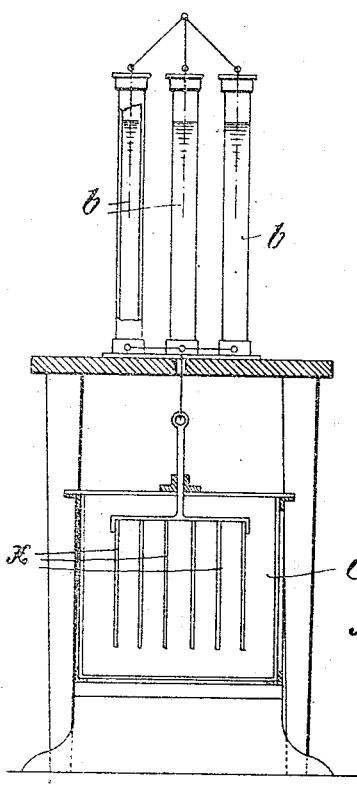
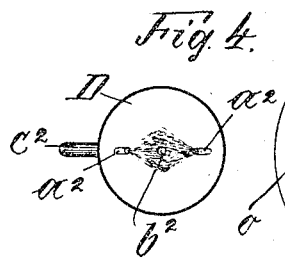
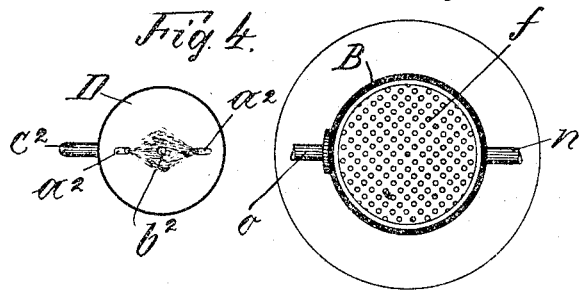
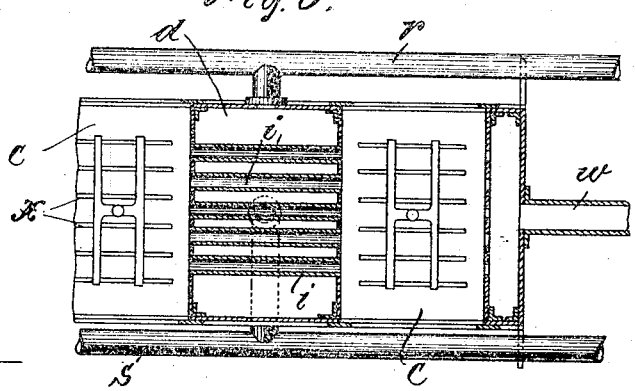
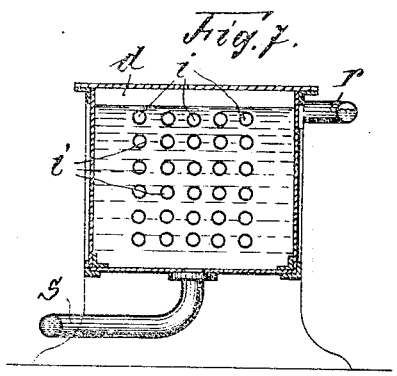
Witnesses:
Emil Kayser
Paul Hollenberg
Inventors
Nicolas van der Sleen
August Schneller
by Wm. E. Boulter,
Attorney

UNITED STATES PATENT OFFICE.

NICOLAAS VAN DER SLEEN, OF HAARLEM, AND AUGUST SCHNELLER, OF ALFEN, NETHERLANDS, ASSIGNORS TO HENRY TINDAL, OF AMSTERDAM, NETHERLANDS.

APPARATUS FOR STERILIZING AND PURIFYING WATER.

SPECIFICATION forming part of Letters Patent No. 596,917, dated January 4, 1898.

Application filed August 31, 1895. Serial No. 561,090. (No model.)

*To all whom it may concern:*

Be it known that we, NICOLAAS VAN DER SLEEN, residing at Haarlem, and AUGUST SCHNELLER, residing at Alfen, in the Kingdom of the Netherlands, subjects of the Queen of the Netherlands, have invented certain new and useful Improvements in Apparatus for Sterilizing and Purifying Water, of which the following is an exact specification.

This invention relates to an apparatus to be used for the purpose of sterilizing and purifying water by means of ozone, and has for its object to provide an apparatus which will produce the desired result in an economical manner and which can be applied commercially.

In carrying our invention into effect we prefer to make use, as far as concerns the generation of the ozone, of the apparatus described in the United States application, Serial No. 535,404, in which the air or oxygen to be ozonized is caused to pass through a number of ozonizing-chambers one after the other and is cooled before passing into the second, third, &c., chamber. In this apparatus each of said ozonizing-chambers contains a number of electrodes, and each of the latter is connected to a specific resistance that is formed by a liquor. The purpose of this arrangement is to prevent the formation of sparks and to allow of silent discharges only, as has all been fully described in the specification of the United States application cited.

Our present invention refers in general to the means for bringing the ozone in intimate contact with the water to be sterilized and purified, and in order to make our invention more clear we refer to the accompanying drawings, in which similar letters denote similar parts throughout the different views, and in which—

Figure 1 is a vertical section through a form of apparatus proposed by us for the sterilization and purification of water by ozone. Fig. 2 is a horizontal section taken on line 10 11 of Fig. 1. Fig. 3 is a vertical section through a modified form of construction. Fig. 4 is a horizontal section taken on line 12 13 of Fig. 3. Fig. 5 is a vertical longitudinal section through the (known) apparatus for producing the ozone, this figure as well as the following ones being shown in order to avoid taking reference to the United States application aforementioned. Fig. 6 is a horizontal section through the right-hand portion of the lower part of the apparatus represented in Fig. 5. Fig. 7 is a vertical cross-section taken on line 14 and 15 of Fig. 5, and Fig. 8 is a vertical cross-section through the whole apparatus for producing the ozone.

In the form of construction shown in Figs. 1 and 2, B is an upright vessel that is provided with a number of perforated disks or plates $f$, arranged one above the other, a short distance being left between every two of them. Said vessel B is filled with the water to be sterilized and purified. Said water flows into the vessel B through the pipe $m$ and leaves the vessel through the pipe $n$. The water is thus caused to pass through all the perforated plates $f$, which latter cause not only a fine division and distribution of the water, but of the ozone, too. The ozone flows into the vessel B through the pipe $o$ and the remainder of the ozone leaves said vessel through the pipe $p$. The water and the ozone are thus caused to flow in opposite directions, and both substances are brought into very intimate contact during that time, as will now be clear without a still more detailed description.

Instead of letting a column of water be acted on by the ozone we may cause the water to be atomized into or within a stream of ozone. We have shown as an example the apparatus represented in Figs. 3 and 4, in which D is the vessel into which both substances are led and within which the sterilization and purification of the water by the ozone is effected. The ozone is led into the vessel D through the pipe $b^2$, and the remainder of the ozone leaves said vessel through the pipe $d^2$. The water passes into the vessel D through a number of small tubes or nozzles or sprays $a^2$, and we prefer to arrange said parts $a^2$ in such a manner with regard to each other, as well as to the ozone-pipe $b^2$, that said nozzles $a^2$ converge toward each other, as well as toward the ozone-pipe $b^2$. The sprays issuing from the nozzles $a^2$ are therefore caused to cross each other or to pass one into the other, and the ozone is caused to pass into the ascending water as well as into that descending. There is thus also in this case a very intimate contact attained. The sterilized and purified water flows off through the pipe $c^2$.

The apparatus A, Fig. 5, for ozonizing the air or for turning oxygen into ozone, respectively, consists in the form of construction shown of four ozonizing-chambers $c\ c\ c\ c$ and of three cooling-chambers $d\ d\ d$, that are arranged so as to alternate with said chambers $c$. These chambers $c$ are connected by pipes $i$, that form passages for the gas on its way from one ozonizing-chamber to the next following one and are cooled by water that is caused to pass through the chambers $d$. The cooling-water is led to said chambers through the pipe $r$ and away from the same through the pipe $s$. The air or oxygen is led into the first ozonizing-chamber through the pipe $t$ and is led off from the last ozonizing-chamber through the pipe $w$, from which it is caused to pass either into the pipe $o$, Figs. 1 and 2, or into the pipe $b^2$, Figs. 3 and 4.

The electrodes contained within the chambers $c$ are all of the same polarity and are each connected with a specific resistance that is formed by liquor, as has already been mentioned. Said liquor is contained within the glass tubes $b$, and the conductive connections between the liquor within these tubes with the electrodes, as well as with the secondary coil of the transformer $a$, is made by wires, as will be clear to every one versed in the art in question. The other end of the secondary coil of the transformer is connected by wires $a'$ to the electrodes of the other polarity, which electrodes are formed by the partition-walls between the chambers $c$ and $d$.

Having thus fully described the nature of our invention, what we desire to secure by Letters Patent of the United States is—

1. In an apparatus for sterilizing and purifying water by means of ozone, the combination with a vessel having in its bottom an inlet for the ozone, of two or more nozzles or sprays adapted to atomize the water to be sterilized or purified, said nozzles or sprays being arranged so as to converge toward each other as well as toward the inlet for the ozone, substantially as described.

2. In an apparatus of the character described the combination with an electrical transforming apparatus, of an ozonizer consisting of a series of independent or separate ozonizing-chambers, cooling devices arranged between the several chambers, and a sterilizer in communication with the ozonizer, and means for effecting a minute subdivision of the liquid within said sterilizer, all as and for the purpose specified.

In witness whereof we have hereunto set our hands in the presence of two subscribing witnesses.

NICOLAAS VAN DER SLEEN.
AUGUST SCHNELLER.

Witnesses:
OLCIDE FABE,
LUCIEN DURIEUX.